(12) United States Patent
Kim

(10) Patent No.: US 7,011,406 B1
(45) Date of Patent: Mar. 14, 2006

(54) EYEGLASS STRUCTURES HAVING MOUNTING SUPPORTS IN TEMPLE MEMBERS

(76) Inventor: Byung Suk Kim, #102-302 Garak2cha Ssangyong Apt., Garakbon-dong 21-6, Songpa-gu, Seoul (KR) 138-758

( * ) Notice: Subject to any disclaimer, the term of this patent is extended or adjusted under 35 U.S.C. 154(b) by 0 days.

(21) Appl. No.: 11/046,084

(22) Filed: Jan. 28, 2005

(51) Int. Cl.
*G02C 5/14* (2006.01)

(52) U.S. Cl. ....................... 351/123; 351/111
(58) Field of Classification Search ............... 351/41, 351/111, 121–123
See application file for complete search history.

(56) References Cited

U.S. PATENT DOCUMENTS

| 3,006,247 A | * | 10/1961 | Davis | 351/123 |
| 3,832,043 A | * | 8/1974 | Usdan | 351/123 |

* cited by examiner

*Primary Examiner*—Huy Mai

(57) ABSTRACT

Eyeglass structures having mounting supports in temple members are provided. This design eliminates conventional nose pads and is free from any physical contact with nose. It provides a comfortable and stylish eyeglass structure to the wearer.

12 Claims, 9 Drawing Sheets

EYEGLASS STRUCTURES HAVING MOUNTING SUPPORTS IN TEMPLE MEMBERS

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention relates to eyeglass structures, and more particularly to eyeglass structures having a pair of temple members whereto mounting supports are attached to secure the eyeglass structure on the ridges of the temporal process of the zygomatic bone of the wearer.

Heretofore, most eyeglass structures have rested and been supported on the nose and the temple members of the eyeglass structures have rested on the ears and engaged both sides of the head behind the ears. Such eyeglass structures have the major portion of the weight thereof concentrated on the nose of the person wearing same and, therefore, tend to bear on and slide down the nose. Constant wearing of these conventional eyeglass structures often results in unsightly creases in the skin and tissue on both sides of the nose. This pressure on the sensitive part of the face can become irritating to the wearer and can even cause permanent creases in the areas of contact upon wearing of these conventional eyeglass structures over an extended period of time. The pressures on both sides of the nose can also cause discomfort to the wearer, e.g., headaches, eye congestions, etc. Traditional eyeglass structures can not be used by many people after nose surgery due to the pressures exerted by conventional frame members. Also, some people have such nose shapes that are difficult and, in some instances, practically impossible to fit with conventional eyeglass structures that will remain in position thereon. It is, of course, understood that a person who is handicapped due to the loss of a nose can not be accommodated by these conventional eyeglass structures.

Attempts have been made to secure eyeglass structures to the head of the wearer using other securing means to avoid fatiguing support on the nose. Such eyeglass structures often require additional components such as headband, suction cups, adhesive devices, and magnetic devices. These additional components may lead to an increase in the production cost of these special eyeglass structures. Head-mount type eyeglass structures are large or have tight headbands or members extending over the top of the head are unsightly and the hairstyle of the wearer could be damaged badly. Furthermore, the shapes and styles of these eyeglasses are quite different than the conventional eyeglasses that are commonly used in nowadays.

While these eyeglass structures may be suitable for the purposes for which they were designed, still there is a need for eyeglass structures that utilize other area than the nose as a supporting base for the eyeglass structure and yet to suffice consumers in convenience, cost, and style.

BRIEF SUMMARY OF THE INVENTION

The present invention is eyeglass structures having a pair of temple members whereto mounting supports are attached to secure the eyeglass structure on the ridges of the temporal process of the zygomatic bone of the wearer.

The principal object of the present invention is to provide an eyeglass structure that overcomes the aforementioned problems and that can be worn without discomfort while avoiding any contact with the nose of the wearer.

One aspect of the present invention is eyeglass structure having a pair of mounting supports and each mounting support is attached to the corresponding temple member. The pad of the mounting support provides a wide contact area with the wearer and distributes the weight of the eyeglass structure throughout the contact area. Each mounting support is located in the closest distance to the ridge of the temporal process of zygomatic bone of the wearer.

Another aspect of the present invention is a method of adjusting the position of the pad of the mounting support to have a proper contact along the ridge of the temporal process of zygomatic bone to secure the eyeglass structure on the head of the wearer. The pad position of the mounting support can be adjusted by bending the C-shaped arm of the mounting support toward the desired direction using a tool such as a plier.

These and other features, advantages and objects of the present invention will become apparent from the following description taken in connection with the accompanying drawings wherein are set forth, by way of illustration and example, certain embodiments of this invention.

BRIEF DESCRIPTION OF THE SEVERAL VIEWS OF THE DRAWING

The drawings constitute a part of the specification and include exemplary embodiments illustrating various objects and features of the eyeglass structure of the present invention.

DETAILED DESCRIPTION OF THE INVENTION

The following discussion describes in detail one embodiment of the invention and several variations of that embodiment. This discussion should not be construed, however, as limiting the invention to those particular embodiments because the disclosed embodiments are merely exemplary of the invention which may be embodied in various forms. Specific structural and functional details disclosed herein are not to be interpreted as limiting but merely as a basis for claims and as a representative basis for teaching one skilled in the art to employ the present invention in any detailed structure.

Figure 1:
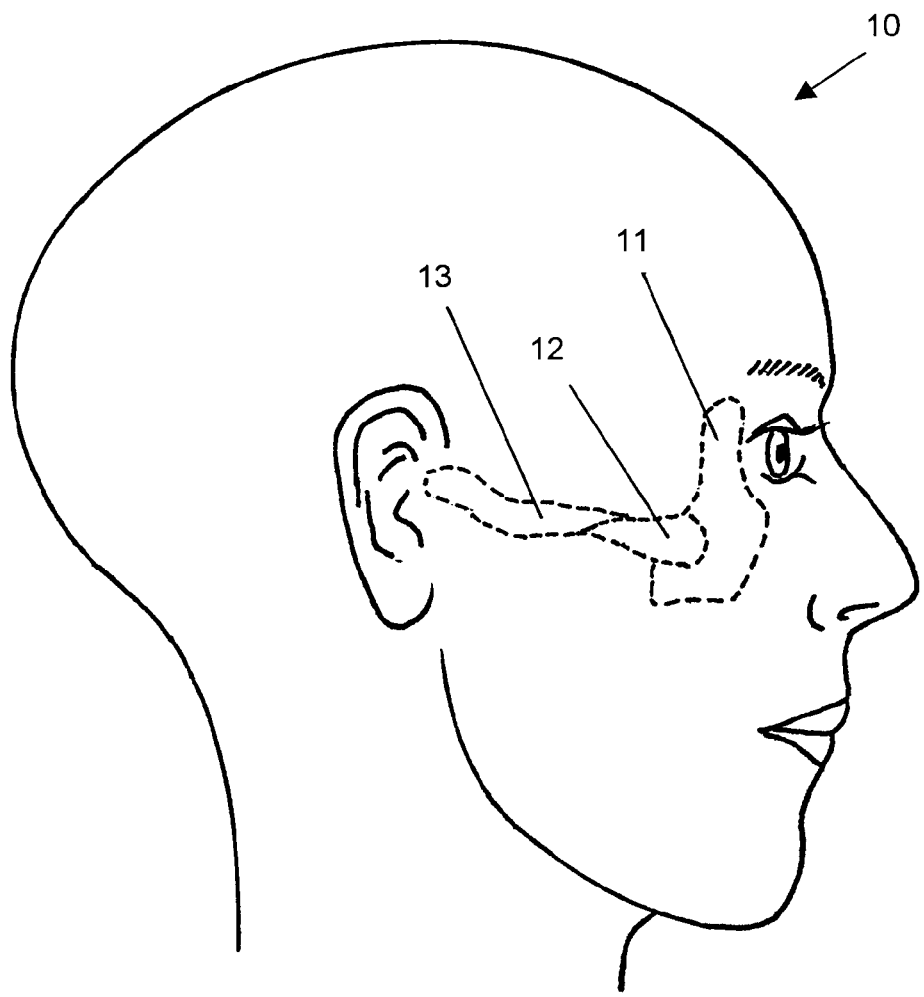
FIG. 1 is a lateral view of a human head showing relevant bone structures.
Figure 2:
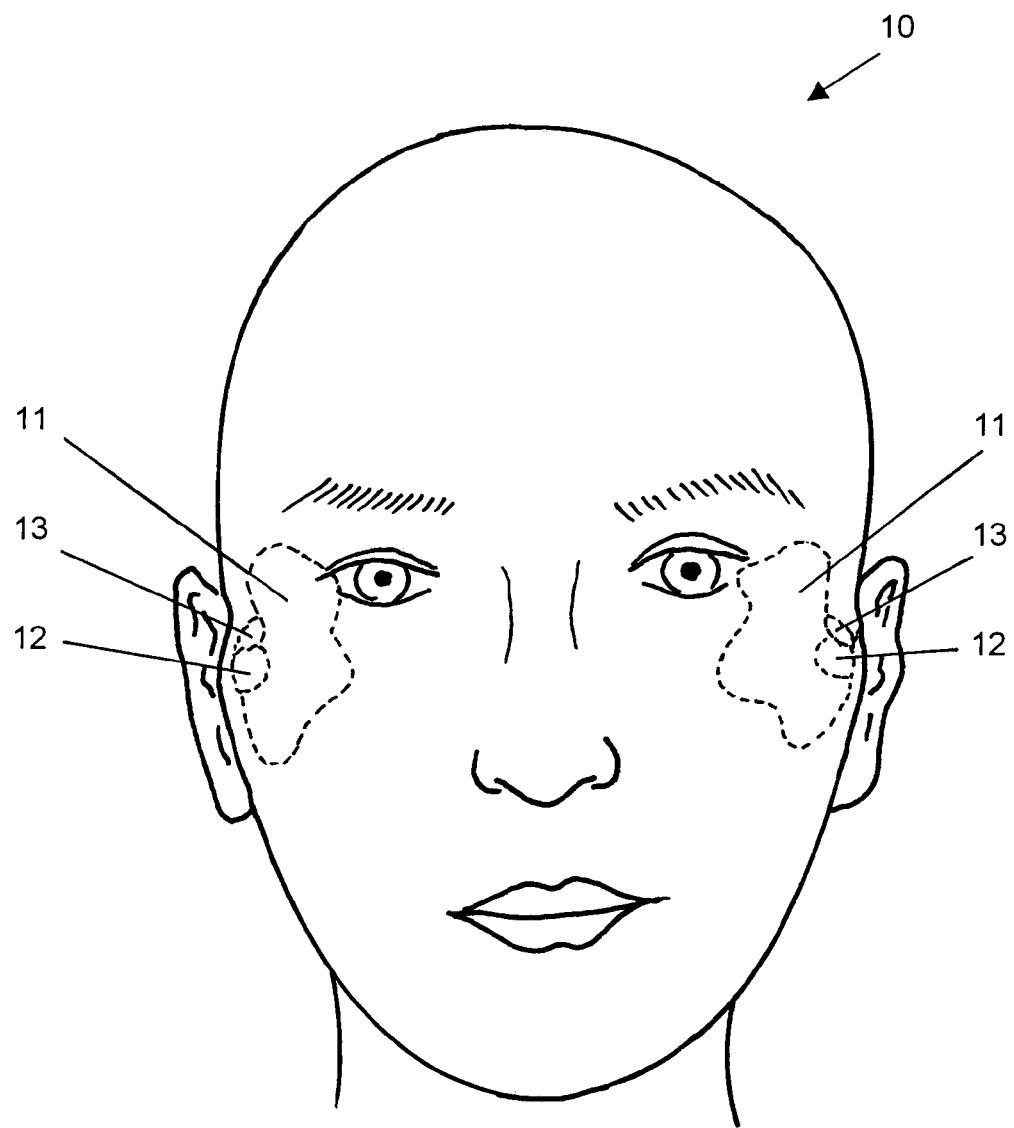
FIG. 2 is an anterior view of a human head showing relevant bone structures.

As shown in FIGS. 1 and 2, there are two zygomatic bones 11 in each human head 10. Each zygomatic bone 11 has a process extending toward the backside of the head along the temple area and is called as the temporal process of the zygomatic bone 12. On the top of the temporal process of the zygomatic bone 12, there is a ridgeline that further extends towards backside of the head through the zygomatic process of the temporal bone 13. This ridge of the temporal process of the zygomatic bone 12 provides a rigid base for the pad 221 of the mounting support 22 of the eyeglass structure 20. Although the ridgeline on the temporal process of the zygomatic bone 12 is an excellent place for the mounting support 22, the ridgeline on the zygomatic process of the temporal bone 13 could be an alternative place for the mounting supports 22 to secure the eyeglass structure 20 to the wearer.

Figure 3:
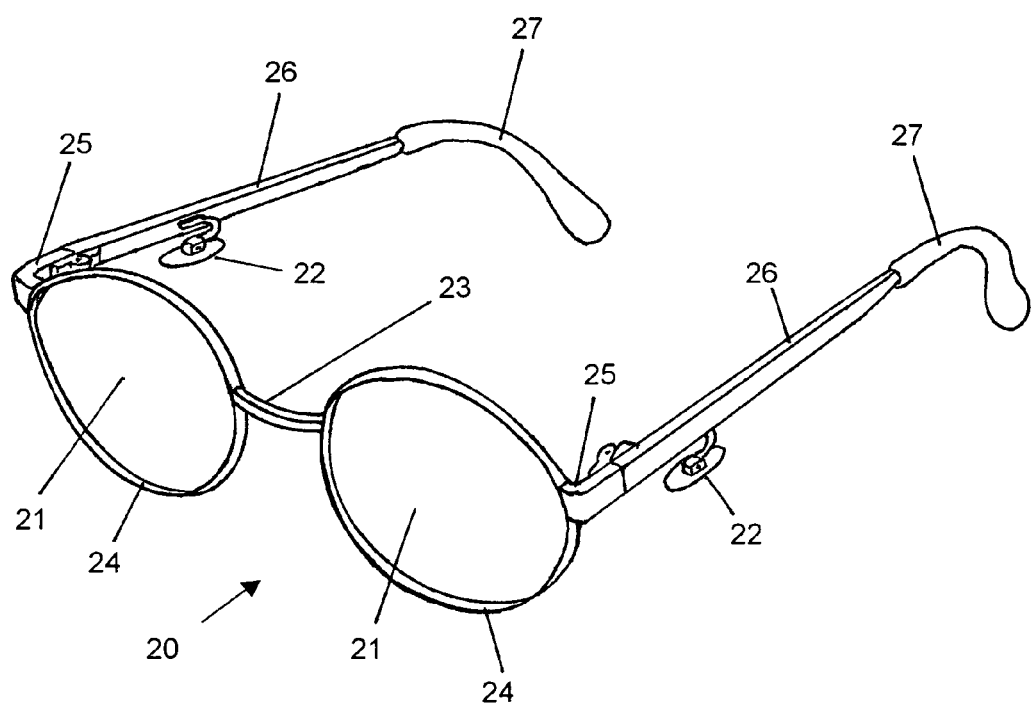
FIG. 3 is a perspective view of the eyeglass structure embodying features of the present invention.
Figure 4:
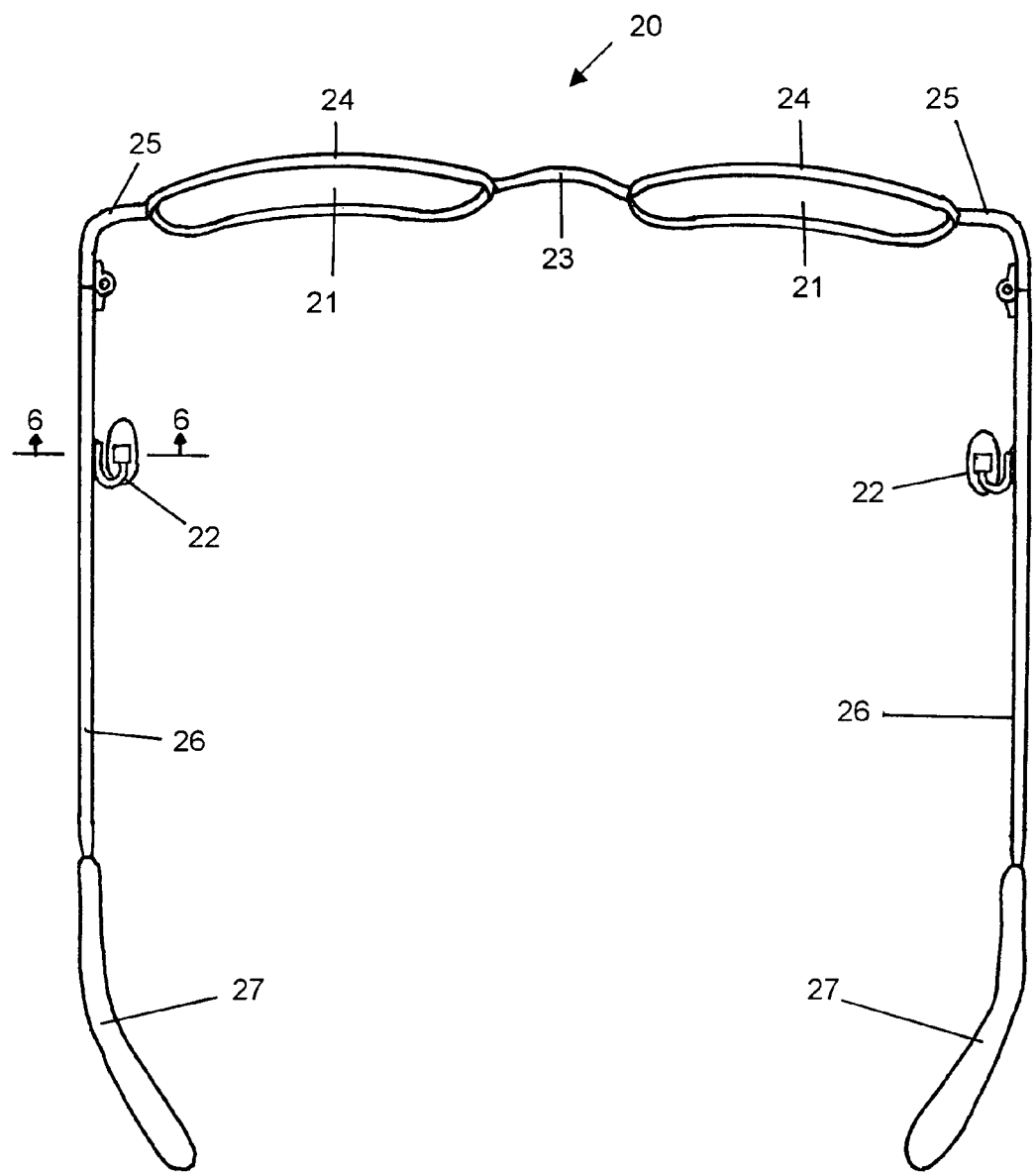
FIG. 4 is a top perspective view of the eyeglass structure embodying features of the present invention.
Figure 5:
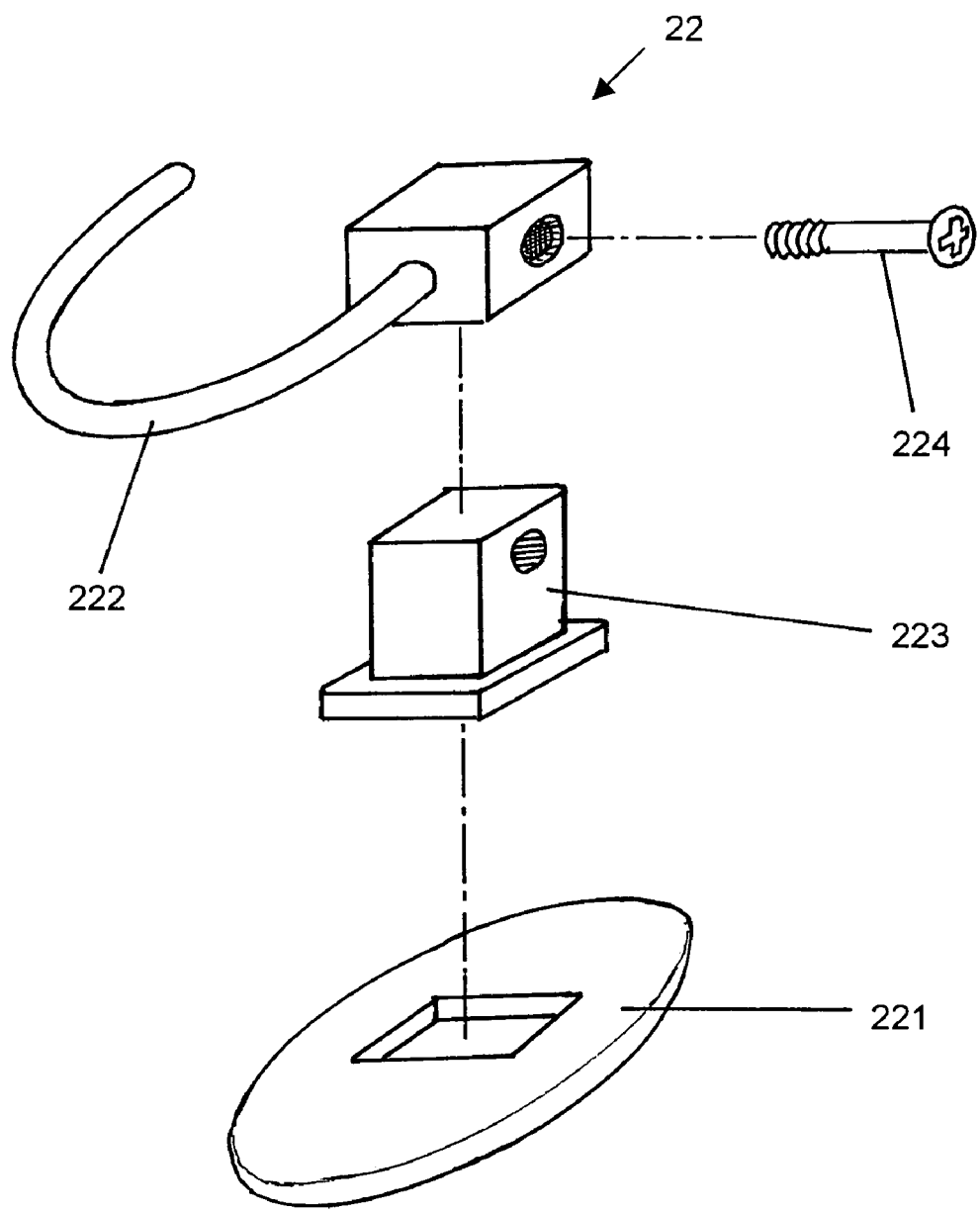
FIG. 5 is an exploded perspective view of the mounting support, an exemplary embodiment of the present invention.
Figure 6:
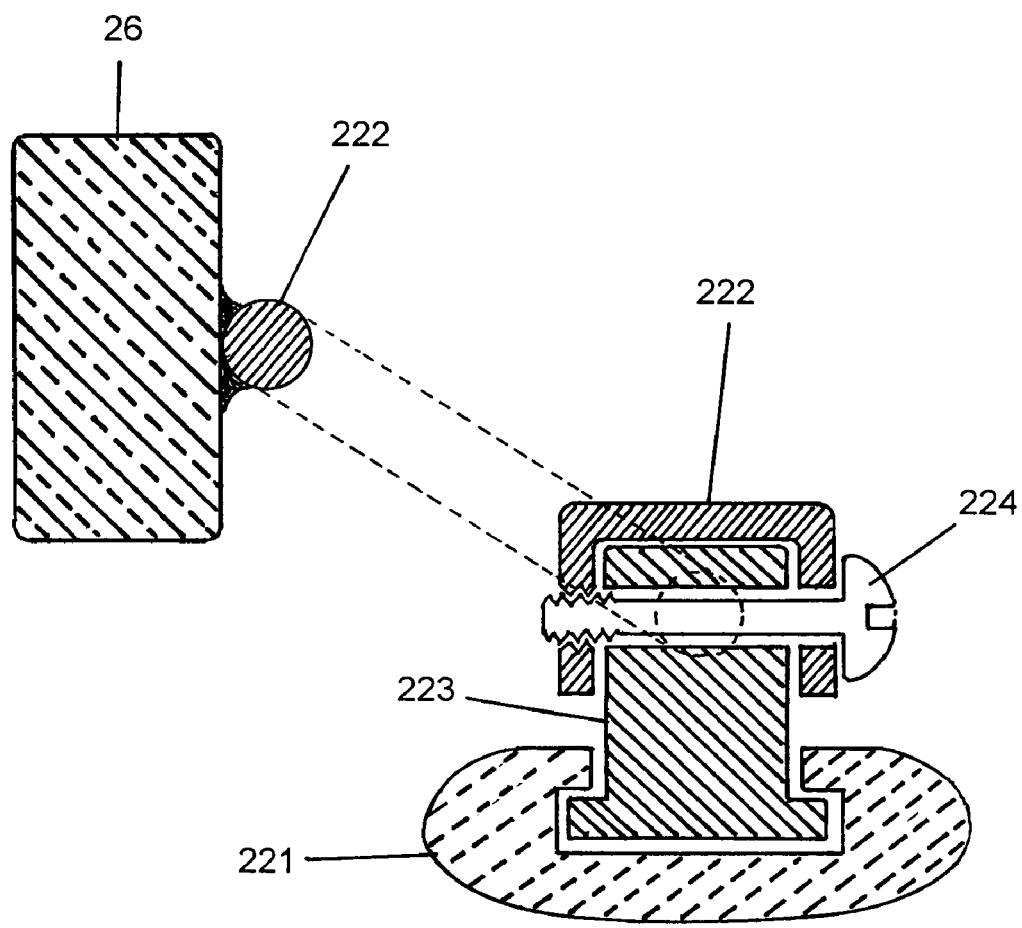
FIG. 6 is an enlarged sectional view of the mounting support taken on line 1—1, FIG. 4.

FIG. 3 is an illustrative view of the eyeglass structure design, a typical embodiment of the present invention. In this design, the eyeglass structure 20 is comprised of a pair of lenses 21, a pair of mounting supports 22, one bridge 23, a pair of eyewire barrels 24, a pair of end pieces 25, a pair of temple members 26, and a pair of temple covers 27. A top perspective view of the eyeglass structure 20 is shown in FIG. 4. A mounting support 22 is attached firmly to the temple member 26 through soldering or welding. The mounting support 22 is comprised of a pad 221, an arm 222, a stem 223, and a screw 224 as shown in FIGS. 5 and 6. The arm 222 of the mounting support 22 is attached to the temple member 26 such that the pad 221 could be rested at the closest distance to the ridge of the temporal process of the zygomatic bone 12 when the eyeglass structure 20 is worn by the wearer. The C-shaped arm 222 of the mounting support 22 can be bended toward any direction whenever necessary to position the pad 221 on the ridge area of the temporal process of the zygomatic bone 12 of the wearer. The arm 222 and temple member 26 should be made of metals that can be easily welded or soldered. The pad 221 can be coupled to the metal stem 223 by pushing the stem 223 into the opening hole of the pad 221. In this case the pad 221 is made of elastic material so the metal stem 223 can be pushed into the smaller opening hole of the elastic pad 221. Injection molding could be an alternative way of coupling the pad 221 with the stem 223 when plastic material is selected for pad 221.

Figure 7:
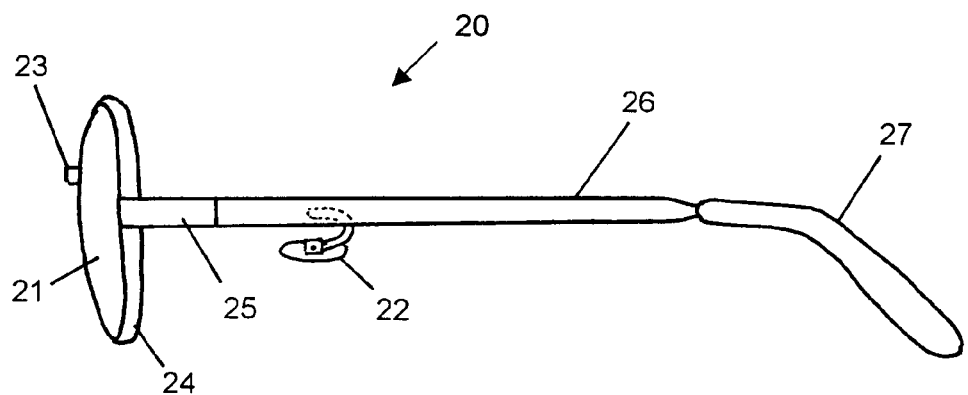
FIG. 7 is a side view of the eyeglass structure with straight temple members, a typical embodiment of the present invention.

FIG. 7 is a side view of the eyeglass structure 20 with straight temple members 26 and curved temple covers 27. The temple cover 27 is bended downward and engaged the side of the head behind the ear. In this design, most part of the mounting support 22 can be seen from the side.

Figure 8:
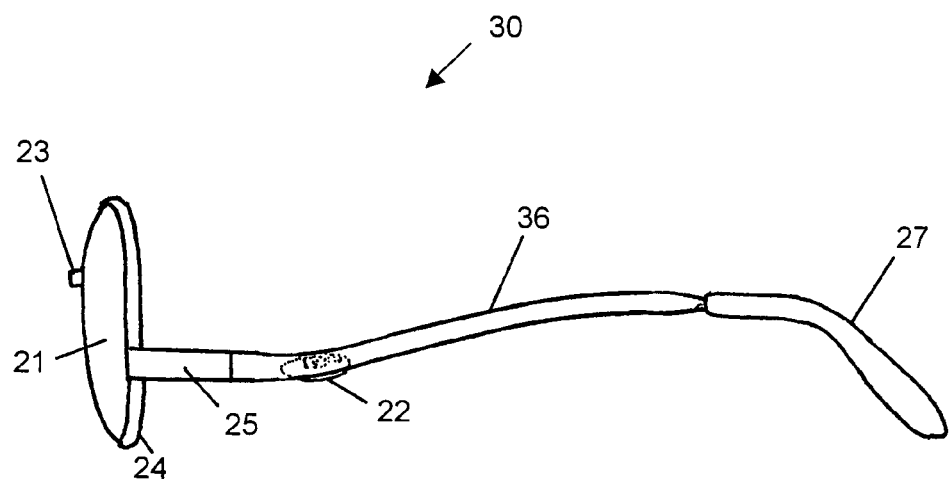
FIG. 8 is a side view of the eyeglass structure with curved temple members, an alternative embodiment of the present invention.

FIG. 8 is a side view of the eyeglass structure 30 with curved temple members 36 and curved temple covers 27. The temple cover 27 is bended downward and engaged the side of the head behind the ear. In this design, only a fraction of the mounting support 22 can be seen from the side.

Figure 9:
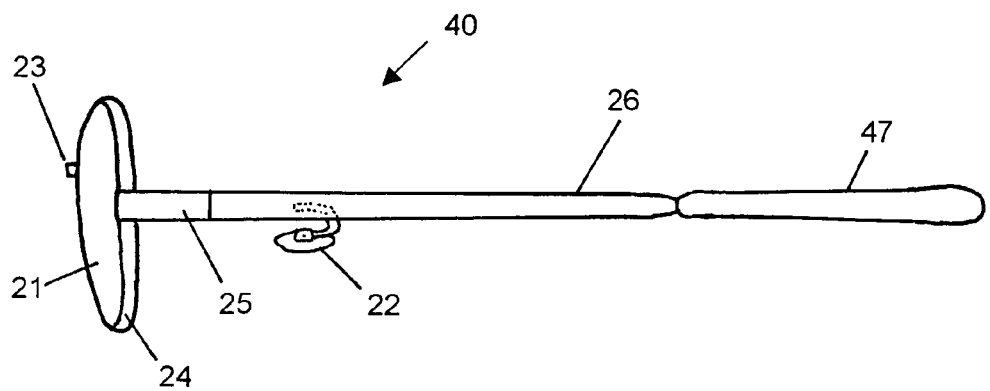
FIG. 9 is a side view of the eyeglass structure with straight temple members and straight temple covers, an alternative embodiment of the present invention.

FIG. 9 is a side view of the eyeglass structure 40 with straight temple members 26 and straight temple covers 47. The temple cover 47 is engaged along the side of the head behind the ear. In this design, most part of the mounting support 22 can be seen from the side.

Figure 10:
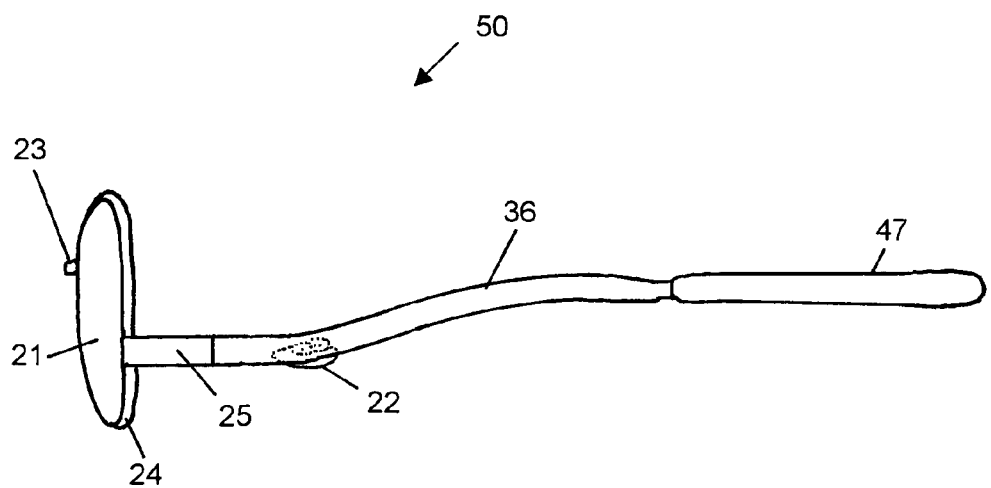
FIG. 10 is a side view of the eyeglass structure with curved temple members and straight temple covers, an alternative embodiment of the present invention.

FIG. 10 is a side view of the eyeglass structure 50 with curved temple members 36 and straight temple covers 47. The temple cover 47 is engaged along the side of the head behind the ear. In this design, only a fraction of the mounting support 22 can be seen from the side.

Figure 11:
FIG. 11 is a perspective view of a person wearing the eyeglass structure embodying features of the present invention.

FIG. 11 is a perspective view of a person wearing the eyeglass structure 20 of the present invention.

The eyeglass structures of the present invention provide a comfortable way to secure the eyeglass structures to the head of the wearer without having any contact with nose. The eyeglass structures of present invention are versatile and can be adjusted to fit a wide range of sizes, and can be made using a variety of different styles.

The above description is considered that of the preferred embodiment only. Modifications of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the doctrine of equivalents.

I claim:

1. An eyeglass structure having:
   a pair of temple members each having a mounting support fixedly attached to inner side of the temple member by welding or soldering;
   wherein, said mounting support is used to secure the eyeglass structure on the ridge of the temporal process of the zygomatic bone when the eyeglass structure is worn by the wearer; and;
   the contact position of the said mounting support on the head of the wearer can be adjusted by bending the arm of the said mounting support.

2. An eyeglass structure defined in claim 1, wherein each mounting support is comprised of:
   an arm, C-shaped, made of metal and bendable with a proper tool;
   a pad to provide a comfortable contact to the wearer;
   a stem to provide a connecting mean between the arm and the pad; and
   a screw to secure the stem to the arm.

3. An eyeglass structure defined in claim 1 having:
   a pair of straight temple members and a pair of curved temple covers.

4. An eyeglass structure defined in claim 1 having:
   a pair of curved temple members and a pair of curved temple covers;
   wherein, the curvature of the temple member enables precise positioning of the mounting support on the head of the wearer.

5. An eyeglass structure defined in claim 1 having:
   a pair of straight temple members and a pair of straight temple covers.

6. An eyeglass structure defined in claim 1 having:
   a pair of curved temple members and a pair of straight temple covers;
   wherein, the curvature of the temple member enables precise positioning of the mounting support on the head of the wearer.

7. An eyeglass structure having:
a pair of temple members each having a mounting support fixedly attached to inner side of the temple member by welding or soldering;
wherein, said mounting support is used to secure the eyeglass structure on the ridge of the zygomatic process of the temporal bone when the eyeglass structure is worn by the wearer; and
the contact position of the said mounting support on the head of the wearer can be adjusted by bending the arm of the said mounting support.

8. An eyeglass structure defined in claim 7, wherein each mounting support is comprised of:
an arm, C-shaped, made of metal and bendable with a proper tool;
a pad to provide a comfortable contact to the wearer;
a stem to provide a connecting mean between the arm and the pad; and
a screw to secure the stem to the arm.

9. An eyeglass structure defined in claim 7 having:
a pair of straight temple members and a pair of curved temple covers.

10. An eyeglass structure defined in claim 7 having:
a pair of curved temple members and a pair of curved temple covers;
wherein, the curvature of the temple member enables precise positioning of the mounting support on the head of the wearer.

11. An eyeglass structure defined in claim 7 having:
a pair of straight temple members and a pair of straight temple covers.

12. An eyeglass structure defined in claim 7 having:
a pair of curved temple members and a pair of straight temple covers;
wherein, the curvature of the temple member enables precise positioning of the mounting support on the head of the wearer.

* * * * *